(12) United States Patent
Kupper

(10) Patent No.: US 9,067,828 B2
(45) Date of Patent: Jun. 30, 2015

(54) METHOD AND PLANT FOR THE PRODUCTION OF CEMENT CLINKER

(75) Inventor: Detlev Kupper, Telgte (DE)

(73) Assignee: ThyssenKrupp Industrial Solutions AG (DE)

( * ) Notice: Subject to any disclaimer, the term of this patent is extended or adjusted under 35 U.S.C. 154(b) by 286 days.

(21) Appl. No.: 13/516,310

(22) PCT Filed: Oct. 7, 2010

(86) PCT No.: PCT/EP2010/065031
§ 371 (c)(1),
(2), (4) Date: Jun. 15, 2012

(87) PCT Pub. No.: WO2011/072902
PCT Pub. Date: Jun. 23, 2011

(65) Prior Publication Data
US 2012/0247370 A1    Oct. 4, 2012

(30) Foreign Application Priority Data
Dec. 18, 2009    (DE) .......................... 10 2009 059 110

(51) Int. Cl.
C04B 7/43    (2006.01)
C04B 7/36    (2006.01)

(52) U.S. Cl.
CPC .. *C04B 7/43* (2013.01); *C04B 7/365* (2013.01)

(58) Field of Classification Search
CPC .................................. C04B 7/43; C04B 7/365
USPC .......................................................... 106/761
See application file for complete search history.

(56) References Cited

U.S. PATENT DOCUMENTS

| 4,101,336 A | | 7/1978 | Touborg | |
| 4,183,762 A | * | 1/1980 | Deussner | 106/750 |
| 4,218,209 A | * | 8/1980 | Herchenbach et al. | 432/14 |
| 4,431,454 A | * | 2/1984 | Krennbauer | 106/762 |
| 4,533,396 A | * | 8/1985 | Herchenbach et al. | 106/758 |
| 5,216,884 A | | 6/1993 | Holsiepe | |

FOREIGN PATENT DOCUMENTS

| DE | 1292319 B | 6/1974 |
| EP | 0076894 A1 | 4/1983 |
| EP | 0896958 A1 | 2/1999 |
| WO | 2008148885 A1 | 12/2008 |

* cited by examiner

*Primary Examiner* — Paul Marcantoni
(74) *Attorney, Agent, or Firm* — Renner Kenner Greive Bobak Taylor & Weber

(57) ABSTRACT

The method according to the invention for producing cement clinker comprises substantially the following method steps:
- raw cement material is preheated in a preheater,
- the preheated material is heated further in a calcining zone while admitting combustion air, and
- the material heated in this manner is fired in a kiln to form cement clinker, wherein a part of the waste gases developing in the kiln is used to preheat the raw cement material in the preheater, and another part is diverted, and is used in a heat exchanger to preheat the combustion air used in the calcining zone.

9 Claims, 1 Drawing Sheet

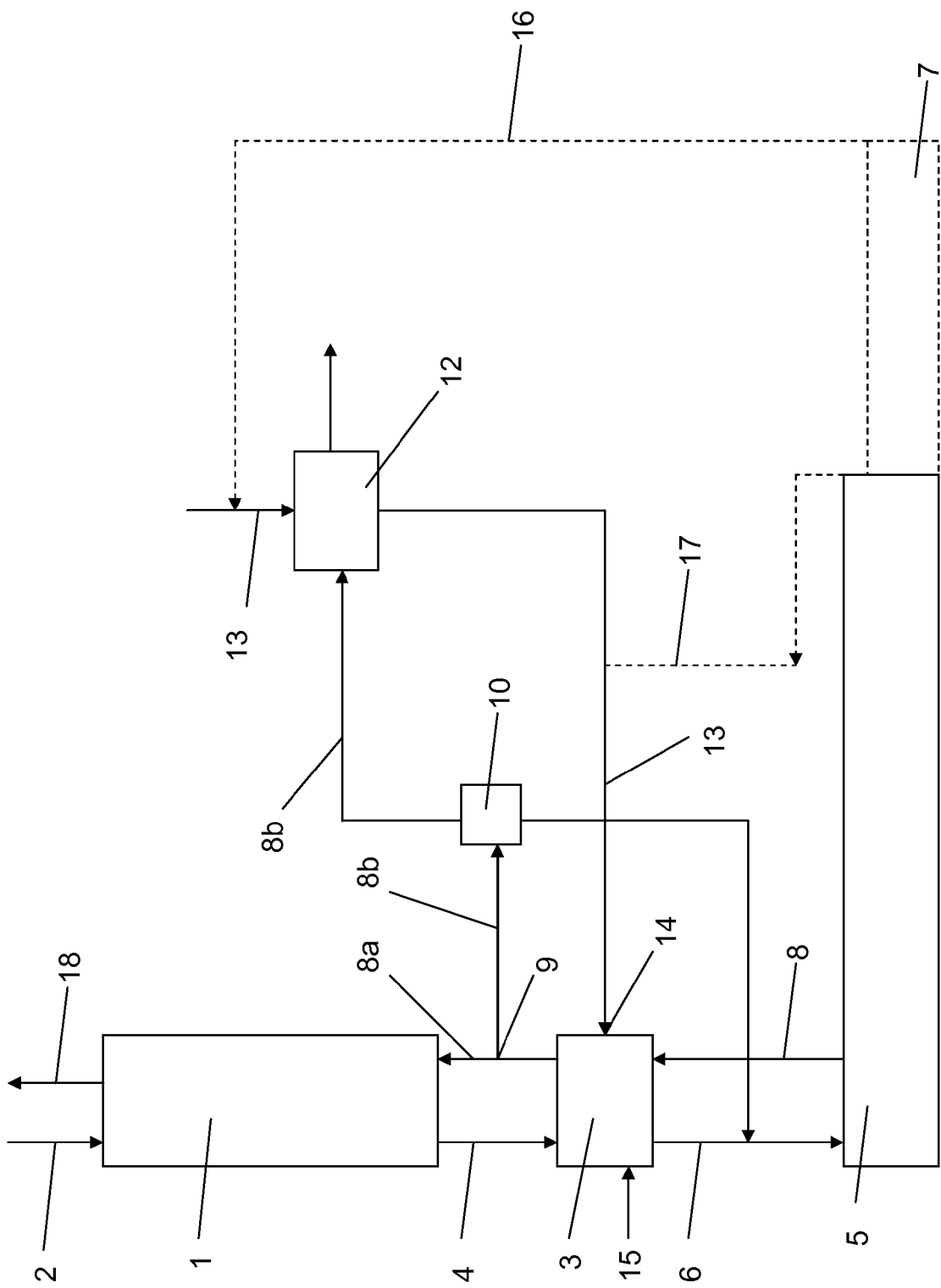

METHOD AND PLANT FOR THE PRODUCTION OF CEMENT CLINKER

The invention relates to a method and a plant and for the production of cement clinker.

In cement production raw cement material is normally preheated in a preheater, subsequently heated further in a calcining zone and finally fired in a kiln. This process is extremely energy-intensive, and so the search for potential improvements in efficiency and possible ways of saving energy is constant.

DE 40 41 251 A1, for example, proposes using a part of the kiln waste gases to generate electrical energy. A similar route is proposed in EP 0 896 958 A1, according to which 30 to 40% of the combustion capacity of the kiln system is removed from the cyclone preheater plant as waste heat output.

The invention addresses the problem of improving the method and the plant for producing cement clinker in terms of costs for the plant and energy efficiency.

That problem is solved according to the invention by the features of claims 1 and 10.

The method according to the invention for producing cement clinker comprises substantially the following method steps:

raw cement material is preheated in a preheater,
the preheated material is heated further in a calcining zone while admitting combustion air,
the material heated in this manner is fired in a kiln to form cement clinker,
wherein a part of the waste gases developing in the kiln is used to preheat the raw cement material in the preheater, whilst another part is diverted and is used in a heat exchanger to preheat the combustion air used in the calcining zone.

The plant according to the invention for carrying out the above method comprises substantially a preheater for preheating the cement raw material,
a calcining zone for further heating of the preheated material, which comprises means for admitting combustion air, and
a kiln for firing the further heated material to cement clinker,
wherein kiln and preheater are connected in such a way that a part of the waste gases developing in the kiln flows through the preheater,
a branch-off provided in the connection between kiln and preheater for a part of the kiln waste gases and
a heat exchanger for heating combustion air, which is connected to the branch-off and is connected to the calcining zone for admission of the heated combustion air.

The concept on which the invention is based is that the preheater can be operated more efficiently by an increase in the capacity flow ratio of solid and gas. In other words, the thermal energy per gas volume proportion at a relatively high capacity flow ratio of solid and gas can be transferred better and more easily to the solid. Diverting a sub-flow of the kiln waste gases produces exactly this increase in the capacity flow ratio, since the amount of solid (raw cement material) is not changed, but a portion of the kiln waste gases is diverted and is therefore not available for preheating.

The thermal energy of the diverted flow is used in the heat exchanger for heating the combustion air required in the calcining zone, which would otherwise have to be preheated in some other way. This also provides an opportunity for the calcining in the calcining zone to be carried out at a somewhat increased temperature in order to compensate for a possible lower preheating of the raw cement material in the preheater.

It is therefore possible that the reduced energy input into the preheater resulting from the diverted portion of the kiln waste gases is partially compensated by the increased capacity flow ratio between solid and gas and the associated increase in efficiency of the preheater and by the preheating of combustion air in the heat exchanger, in such a manner that the overall energy consumption for the production of the cement clinker is reduced or remains the same, and at the very least does not increase.

The reduced gas volume in the preheater additionally enables correspondingly smaller and hence more cost-effective preheater stages to be used.

Further embodiments of the invention are the subject matter of the subsidiary claims.

According to a preferred embodiment of the invention, the diverted part of the kiln waste gases is fed to a separator upstream of the heat exchanger. The dust load separated there can be fed in particular to the kiln.

When using alternative raw materials and/or alternative/secondary fuels, the higher water content leads to a correspondingly higher quantity of kiln waste gases, for which the preheater is not designed. Using the method according to the invention the increased quantity of gas can be discharged without problem via the diverted flow, by adjusting the volume of the diverted flow so that the gas volume in the preheater remains constant.

In order to ensure adequate preheating of the raw cement material, preferably 75 to 95% by volume of the kiln waste gases are used in the preheater. Furthermore, it is advantageous for the temperature of the kiln waste gases to be introduced into the preheater and of the diverted part to be at least 830° C.

The diverted part of the kiln waste gases is fed, bypassing the preheater, to the heat exchanger, or is fed to begin with to a separator, in particular to a cyclone separator. It would also be possible, however, for diversion of the waste gases to be effected after the lowermost cyclone of a multi-stage cyclone preheater.

Further advantages and constructions of the invention are explained in detail hereafter with reference to the description and the drawing.

The drawing shows a schematic representation of a plant for producing cement clinker.

The plant substantially comprises a preheater 1 for preheating raw cement material 2, a calcining zone 3 for further heating of the preheated material 4 and a kiln 5 for firing the further heated and precalcined material 6 to form cement clinker. A cooler 7 normally adjoins the kiln.

The kiln 5 and the preheater 1 are connected to each other in such a way that a part 8a of the waste gases 8 developing in the kiln flows through the preheater. A branch-off 9 for a part 8b of the kiln waste gases is provided between the connection of kiln 5 and preheater 1, here between the calcining zone 3 and preheater 1.

The part 8b of the kiln waste gases is fed to a separator 10, in order to rid the gas flow of its dust load 11. Whereas the dust load 11 is admitted to the kiln 5 together with the precalcined material 6, the diverted and de-dusted part 8b of the kiln waste gases passes into a heat exchanger 12 for preheating combustion air 13. Via means 14 for conveying combustion air the preheated combustion air passes into the calciner in order there to effect a further heating and precalcining of the preheated material 4, optionally with the admission of additional fuel 15.

According to the variant indicated by broken lines, the waste air (secondary air 16 or tertiary air 17) of the cooler 7 can also be used partially or completely for the combustion air 13.

The above-described method is particularly suitable for producing white cement clinker, since in that instance water is used for especially rapid cooling and as a result the tertiary air has only a relatively low temperature of about 320° C. A preheating is therefore needed before the tertiary air can be used in the calcining zone 3. The heat exchanger 12 provides a very efficient preheating with a high level of efficiency of currently about 50 to 70%, without additional expenditure of energy being needed.

Owing to the reduced amount of gas in the preheater, the preheated material 4 may possibly adjust to a somewhat lower temperature, but this can be compensated, as necessary, by a corresponding increase of the energy input into the calcining zone.

Furthermore, the thermal energy of the diverted part 8*b* of the kiln gases not needed in the heat exchanger for preheating the combustion air is available for use in other parts of the plant, such as a raw material mill, for electricity generation or the like.

When producing white cement clinker, a temperature of the kiln waste gases of 850 to 880° C. has proved advantageous in the region of the branch-off In the case of a four-stage preheater, the temperature of the preheater waste air 18 is then, for example, 350 to 370° C. Without the diverted branch flow, the temperatures of the waste gas would be 30 to 70° C. higher.

The use of at least a part of the diverted kiln waste gases results in a more efficient use of energy. Furthermore, additional energy for the preheating of the combustion air can be saved. The reduced overall size of the preheater because of the low gas flow results in a lower initial outlay.

The invention claimed is:

1. A method for producing cement clinker, wherein
   a. raw cement material is preheated in a preheater,
   b. the preheated material is heated further in a calcining zone while admitting combustion air,
   c. the material heated in this manner is fired in a kiln to form cement clinker,
   d. wherein a part of the waste gases developing in the kiln is used to preheat the raw cement material in the preheater, and another part is diverted, characterised in that at least a part of the diverted kiln waste gases is used in a heat exchanger to preheat the combustion air used in the calcining zone.

2. A method according to claim 1, characterised in that the diverted part of the kiln waste gases is fed to a separator upstream of the heat exchanger.

3. A method according to claim 2, characterised in that the diverted part of the kiln waste gases has a dust load that is separated in the separator and re-admitted to the kiln.

4. A method according to claim 1 characterised in that in the case of an increased amount of gas resulting from the use of alternative raw materials and/or fuels, the diverted flow is adjusted in terms of quantity in such a manner that the gas volume through the preheater remains constant.

5. A method according to claim 1, characterised in that one or more of tertiary air of a cooler and ambient air is used as combustion air to be preheated.

6. A method according to claim 1, characterised in that 75 to 95% by volume of the kiln waste gases are used in the preheater.

7. A method according to claim 1, characterised in that the reduced energy input into the preheater resulting from the diverted part of the kiln waste gases is partially compensated by the capacity flow ratio between solid and gas and the associated increase in efficiency of the preheater and by the preheating of combustion air in the heat exchanger, in such a manner that the overall energy consumption for the production of the cement clinker is not increased.

8. A method according to claim 1, characterised in that the one part of the kiln waste gases having a temperature of at least 830° C. is introduced into the preheater and the other part of the kiln waste gases having a temperature of at least 830° C. is diverted.

9. A method according to claim 1, characterised in that the part of the kiln waste gases to be fed to the heat exchanger is diverted between the calciner and the preheater.

* * * * *